US008429044B2

(12) United States Patent
Chen et al.

(10) Patent No.: US 8,429,044 B2
(45) Date of Patent: Apr. 23, 2013

(54) LIFTING PARTNER GROUPS FOR ALLOCATION OF LIFTED PRODUCT CONSISTENT WITH PRODUCTION SHARING CONTRACTS

(75) Inventors: Justin Chen, Singapore (SG); Timothy Crossett, Östringen (DE); Armin Risch, Arlington, VA (US)

(73) Assignee: SAP AG, Walldorf (DE)

( * ) Notice: Subject to any disclaimer, the term of this patent is extended or adjusted under 35 U.S.C. 154(b) by 3082 days.

(21) Appl. No.: 10/936,541

(22) Filed: Sep. 9, 2004

(65) Prior Publication Data

US 2006/0053024 A1    Mar. 9, 2006

(51) Int. Cl.
    G06Q 40/00    (2012.01)
(52) U.S. Cl.
    USPC ............................................. 705/35
(58) Field of Classification Search ............... 705/1, 1.1, 705/35; 703/10; 709/220, 238
    See application file for complete search history.

(56) References Cited

U.S. PATENT DOCUMENTS

| | | | |
|---|---|---|---|
| 6,397,195 B1 | 5/2002 | Pinard et al. | |
| 6,442,533 B1 | 8/2002 | Hinkle | |
| 7,096,194 B2 | 8/2006 | Johnson | |
| 7,120,597 B1 | 10/2006 | Knudtzon et al. | |
| 7,246,137 B2 * | 7/2007 | Paulus et al. ......................... | 1/1 |
| 7,548,880 B1 | 6/2009 | Mintz | |
| 2001/0039500 A1 | 11/2001 | Johnson | |
| 2002/0138387 A1 | 9/2002 | Griffin | |
| 2002/0188500 A1 * | 12/2002 | Kwok et al. .................... | 705/10 |
| 2003/0036988 A1 | 2/2003 | James | |
| 2003/0097319 A1 * | 5/2003 | Moldovan et al. .............. | 705/35 |
| 2003/0110043 A1 * | 6/2003 | Morrison et al. ................. | 705/1 |
| 2003/0167175 A1 * | 9/2003 | Salom .............................. | 705/1 |
| 2004/0148248 A1 | 7/2004 | Allen et al. | |
| 2004/0220790 A1 * | 11/2004 | Cullick et al. .................. | 703/10 |
| 2005/0119922 A1 | 6/2005 | Eder | |
| 2005/0131788 A1 | 6/2005 | Verdonik | |
| 2007/0179872 A1 | 8/2007 | Macalka et al. | |

OTHER PUBLICATIONS

Dr. Irina Paliashvili, "The Concept of Production Sharing," Sep. 14, 2008, pp. 1-6, www.rulg.com/documents/The_Concept_of_Production_Sharing.html.*

No Author, Production Sharing Contract for the Exploitation of Coalbed Methane Resource for the Qinnan Area in Shanxi Province, Qinshui Basin, The Peoples Republic of China between China United Coalbed Methane Corporation and Phillips China, Beijing china. Apr. 16, 2002 agrreements.realdealdocs.com/Production-Sharing-Agreement/PRODUCTION-SHARING.*

(Continued)

*Primary Examiner* — Ella Colbert
(74) *Attorney, Agent, or Firm* — Kenyon & Kenyon LLP

(57) ABSTRACT

An embodiment of the invention regards allocating lifted product volumes to specific entities of a Production Sharing Contract (PSC) through the use of Lifting Partner Groups (LPG) and an Entitlement Percentage (EP), which is itself calculated, consistent with the terms of the PSC. Through this system, specific PSC members no longer need to be identified for each specific terminal lift to allocate the lift back to the PSC entity. Rather, the EP is used in conjunction with the Lifting Product Groups to split up the portion of each lift attributable to each entity for actual accounting purposes, and further to determine the average sales price(s) to be used in calculating total production revenue.

27 Claims, 7 Drawing Sheets

OTHER PUBLICATIONS

Indonesia Oil Discovery in Natuna Sea; "Natuna Sea Oil Discovery Boosts 2 Companies"; Australia Financial Review(AFR); Jul. 13, 1995; p. 1.*

Wall Street Journal;"(Indonesian Natl Consortium Activities Ltd. (INCA), Brit West Indies private corp with signigicant US investment participation, signs production-sharing oil agreement with Indonesian state-owned oil co, Pertamina, covering 8,200 square miles in separate tracts offshore Indochina's Natuna Island area";Tuesday,Jul. 15,1975;p. 1.*

Joint Venture Accounting with mySAP Oil & Gas, SAP White Paper, 2001.

"SAP and KPMG Consulting Form Alliance to Introduce NewSAP R/3 Joint Venture . . . ", Business Wire, Jul. 21, 1998.

* cited by examiner

Figure 3 - Estimated Crude Oil Entitlement Percentage (COEP)

Figure 4 - PSA Lifting Allocations
(Period = Monthly Allocation)
(Avg. Quarterly Earnings)

Figure 5 - Adjusting Lifted Sale Price (Non-arm's length sales price less than quarterly arm's length sales price)

LIFTING PARTNER GROUPS FOR ALLOCATION OF LIFTED PRODUCT CONSISTENT WITH PRODUCTION SHARING CONTRACTS

FIELD OF THE INVENTION

The present invention regards methods, machines, systems, networks, storage devices, and apparatus directed to accounting for the production or sale of products sold by companies operating under production sharing contracts, and sometimes joint ventures or other multiple entity arrangements. More specifically, the present invention regards the use of defined groups to allocate profits and costs over a period of time back to the entities comprising the groups consistent with the agreed terms by which the entities collaborate in order to manufacture or sell a product.

BACKGROUND

Global oil and gas companies participate in drilling and production operations around the world. These operations often include participating in Joint Ventures ("JVs"), which may include other companies, local governmental entities, and local contractors, to share the costs and risks involved in the undertaking. These JVs are often directed to the drilling, production, and storage of crude oil and other fossil fuels. With multiple members, JVs often control the benefits and burdens allocated between its members with an agreement commonly identified as a Joint Operating Agreement ("JOA").

Before a Joint Venture can carry out its venture activities, in some countries, the operating oil and gas company of the venture must enter into a production sharing agreement or contract (PSC) with the local government. Consequently, by default, the non-operating companies in the venture are indirectly party to the PSC as well, though they are not normally mentioned in the PSC itself.

PSCs define the framework and measureables that ensure the initial exploration and eventual hydrocarbon production sharing, between the government and the 'contractor' (i.e. the operating oil company), are completed in accordance with the key terms and elements of the PSCs. The PSCs typically include, but are not restricted to: duration & relinquishment periods for exploration & production phases; minimum financial commitments and expenditure obligations; valuation of oil & gas; division of oil & gas under royalty; tax oil; cost oil/gas & profit oil/gas; priority of cost claims; cost oil; contractual payments such as research, discovery & production bonuses; and accounting and entitlement reporting requirements.

The allocation of costs, profits, entitlements, and other applicable variables is often based on production while in other cases it may be based on the sales of product. In any event, not only are the costs, profits and entitlements split between the government and contractor, but they are also split with any other party that belongs to a Joint Venture with whom the contractor is a party to.

Moreover, the terms of a PSC may vary from PSC to PSC, with allocation percentages and applicable accounting formulas and methodologies varying between agreements. In some instances, the allocation of costs, profits, entitlements, and other variables may be based on the petroleum production while in others these allocations may be based on other things, such as petroleum sales. When sales are measured, they may be categorized into those made to related entities such as subsidiaries of members of the PSC (i.e., non-arm's length transactions) and those made to wholly unrelated entities (i.e., arm's length transactions).

Product sales may be accounted for when the product is lifted from a storage facility used by one or more parties to the PSC. These storage facilities are often shared by several PSC's. Thus, the product produced under each PSC is often commingled prior to sale.

SUMMARY OF THE INVENTION

The present invention regards systems, methods and apparatus that may allocate lifted product volumes to specific PSCs and entities of a Production Sharing Contract (PSC) through the use of Lifting Partner Groups (LPG) and an Entitlement Percentage ("EP"), which is itself consistent with the terms of the PSC. Through the present invention specific PSCs and PSC members no longer need to be identified for each specific terminal lift. Rather, the EP may be used in conjunction with the Lifting Partner Groups to split up the portion of each lift attributable to each PSC and PSC entity for actual accounting purposes.

Thus, the EP and the LPG may be used with anticipated production volumes and costs for planning purposes and with actual production volumes and costs for hindsight accounting. The EP and the Lifting Partner Groups may also be used: 1) to enable tracking of volumes for arm's length and non-arm's length sales and the calculation of arm's and non-arm's length lifted sales prices; 2) to apportion lifted volumes to each PSC and PSC party 3) to track storage entitlements at storage facilities for each PSC and PSC party. They may have other uses as well.

DETAILED DESCRIPTION

Figure 1:
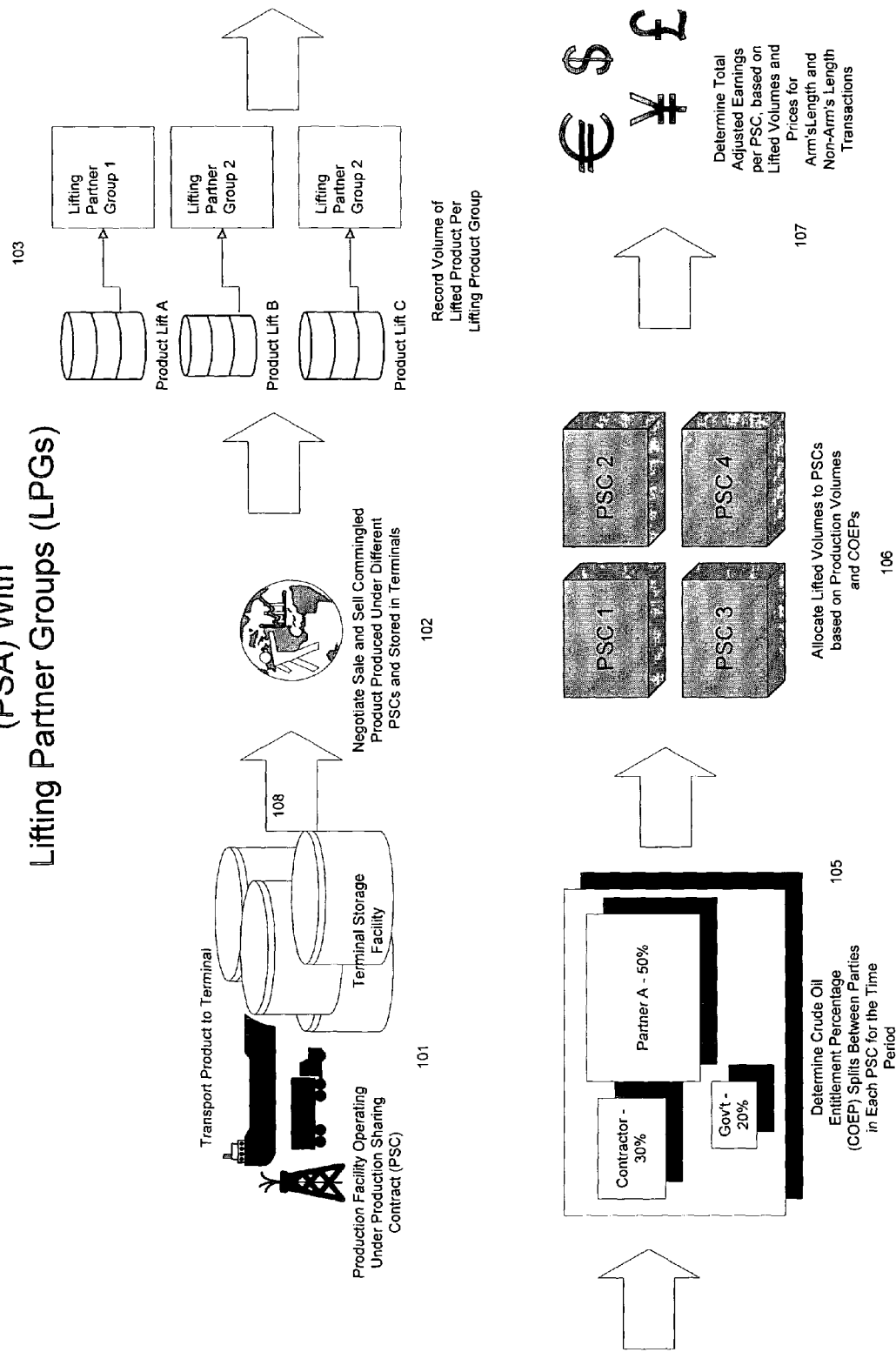
FIG. 1 is a flow chart of a production sharing accounting process that employs lifting partner groups in accordance with the present invention.

The invention is directed to new methods, systems, apparatus, and procedures to make relevant accountings for a PSC consistent with the terms of the applicable PSC. These methods, systems, apparatus, and procedures may be used for real time tracking as well as for forecasting purposes. The invention includes using Lifting Partner Groups ("LPGs") and Crude Oil Entitlement Percentages ("COEPs") to: 1) allocate product sales without using a specific company code for each sale; 2) account for both arm's length and non-arm's length sales; 3) account for entitlement estimates of stored product. 4) apportion product sales to individual PSC's and members of a PSC.

By employing the COEP, which is created to be consistent with the terms of the PSC, specific PSCs and entities of the PSC no longer need to be identified for each specific terminal lift to allocate the lift back under the terms of the PSC to the PSC and PSC entities. Rather, the COEP is used in conjunction with the LPGs to split-up the portion of each lift attributable to each PSC and PSC entity. The LPG and COEP may be used with anticipated production volumes and costs for planning purposes as well as with actual production volumes and costs for hindsight accounting. The COEP and the Lifting Partner Groups may also be used: 1) to enable tracking of volumes for arm's length and non-arm's length sales and the calculation of arm's and non-arm's length lifted sales prices; 2) to apportion lifted volumes to each PSC and PSC party 3) to track storage entitlements at storage facilities for each PSC and PSC party. In one application, LPGs are created and COEPs are calculated and then used to allocate applicable lifts back to the individual PSCs and members of the PSC. The LPG can contain any party who is involved in lifting product from a terminal, although, one party may only be assigned to a single LPG at any point in time. The COEP may be based upon the terms of the PSC and may be used to designate the specific percentage of each lift that can be attributed to each PSC and PSC member for that specific lift. Considerations used to calculate the COEP may include oil price, production volumes for each PSC, anticipated recoverable costs, royalties, and the defined split percentages between the government and contractor. These considerations can vary from PSC to PSC depending upon its terms. The resulting COEP should represent the percentage of entitlements each PSC party is due for each lift or sale of product during a specific time period. Thus, the COEP may be different for each PSC entity as well as for each period of measured time (e.g., month or quarter).

Once the LPG and COEP are identified, specific lifts may be allocated back to individual entities and profitability may be determined for anticipated sales, changes in production, product exchanges, etc. The COEP may be predicted on anticipated numbers determined from forecasts or from scenario evaluations to assist in optimizing production operations.

When sales are made to entities related to or under the control of the PSC entities, the sales prices may need to be adjusted to conform with real market prices. These adjustments may include applying a weighted average sales price for arm's length sales from the same period or a similar period, as well as standard terminal prices from the same or similar periods.

FIG. 1 is a flow chart that provides an overview of a Production Sharing Accounting (PSA) process in accord with the current invention. This process, which may be carried out in a computer or stored in volatile or non-volatile memory used by a computer, regards tracking and then allocating costs and profits stemming from the exploration and sale of crude oil or other petroleum products.

Step 101 of the overview shows upstream steps that an oil company may complete in selling and accounting for crude oil produced and delivered to market. These include producing, transporting, and then storing crude oil at a terminal storage facility. During these steps the oil company may be acting alone or in conjunction with JV partners and using its assets to produce and then transport the petroleum crude oil. When, however, the crude oil reaches the terminal storage facility it may be mixed with crude oil from other PSC's.

Once commingled, the crude may then be sold at step 102 to refiners or other companies that have a need for the product. As the crude is sold, each sale or lift is accounted for at step 103. There, when a sale is made, the sale or lift is associated with a specific lifting partner group (LPG) in order to credit the members of the group with the sale of the product. In order to split the lifted volumes from the Lifting Partner Group back to each PSC and its individual members, at step 105 the Crude Oil Entitlement Percentages (COEPs) that have been assigned to each member of the Lifting Partner Group may be obtained along with the applicable production percentages for all PSC's. Next, at step 106, the sale may be allocated back to each PSC, and the individual members that originally transported the crude to the storage facility, by splitting the lifted volumes using the COEPs and production percentages across all PSC's. Once these allocations are undertaken, final earnings adjustments, in accordance with the Production Sharing Contract between the members of the PSC, may be made at step 107 in order to make final allowances to each PSC party in accord with the PSC.

Figure 2:
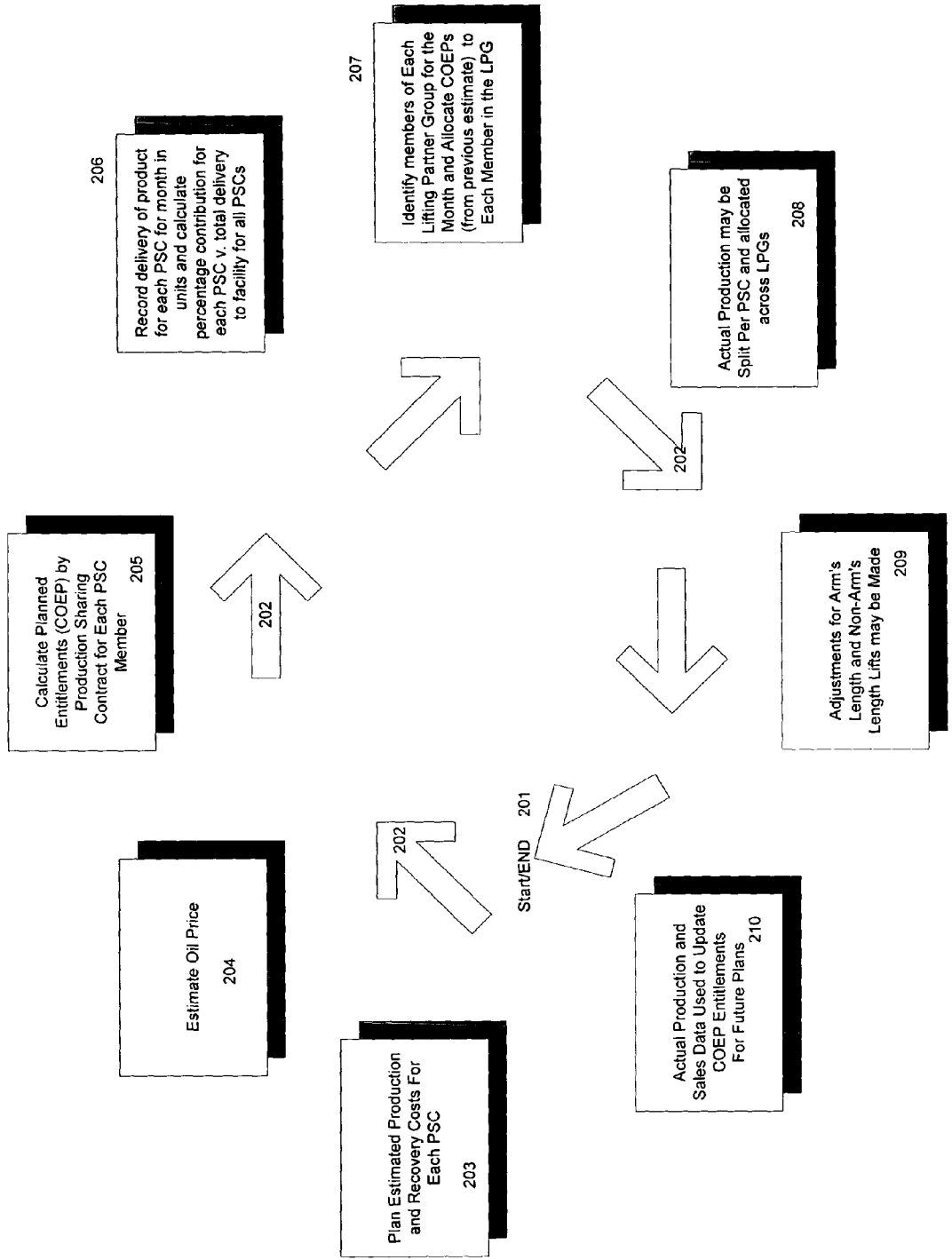
FIG. 2 is a flow chart of steps that may be taken to use a lifting partner group in a production sharing accounting process in accordance with the present invention.

FIG. 2 shows a more detailed description of a PSA system that employs Lifting Partner Groups in accordance with the current invention. The method of FIG. 2 may begin and end at 201 with the steps proceeding in clock-wise fashion in the direction of arrows 202. In steps 203 and 204 of the method of FIG. 2, planning estimates addressing the anticipated production of crude oil per well, the anticipated demand of the crude oil at each terminal, and the anticipated sale price may all be made. Using these estimates or other projections, the planned entitlements for each of the members of a PSC may then be calculated at step 205. The methods for calculating these entitlements, may be specifically identified in the PSC, and can include: production revenue, royalties, net production sharing, cost cap, costs allowed for recovery, net profit, excess profit, net entitlement, and the splits of these items between the government and contractor. Once calculated, the net entitlement percentages for each PSC party are used as a guideline for the COEPs, which may be used later on in the process to allocate specific lifts to PSCs and members of the PSC in compliance with the terms of the PSCs.

At step 206 of the method, the production and delivery of product to each terminal for a month or some other defined period of time is recorded. In so doing, the amount of stored product at a terminal may be calculated by summing the net deposits and subtracting the net withdrawals and the percentage of product belonging to each PSC and each JV has contributed to the storage facility. When totaling the percentage of product that each JV under one PSC has stored at the facility, it is preferable that the percentages allotted between the JVs for that terminal during the month sum to substantially 100%. Thus, if JV1 transported 120,000 bbls to the terminal and JV2 transported 56,000 bbl to the terminal, JV1 would be allotted 68.18% of the sales from the terminal and JV2 would be allotted 31.2% of the sales from the terminal for that month, assuming all product in the terminal came from one PSC.

Next, at step 207, lifting partner groups (LPGs) may be identified and created to account for specific sales or lifts made from the terminal. As each lift is made, the party or parties that are responsible for the sale are identified and grouped together as a Lifting Partner Group. If the individual entities have not previously been grouped together during the month, then a new Lifting Partner Group may be created, but, if the parties have already made a sale that month, then the existing LPG may be used. When the members of the LPGs are identified, the COEP of each member can be determined based on the COEP percentages defined for each PSC, JV and partner combination, as created in step 203. This COEP may therefore depend upon which partners are responsible for the sale if the member of the LPG belongs to more than one JV.

In a preferred embodiment, the COEP percentages allotted for all the members of the PSC and JV combination must sum to 100%. In so doing, a PSC and PSC parties will be credited for sales in accord with the amount of crude oil it transported to the storage facility. Furthermore, as the members of the lifting partner groups may change from month to month, the COEPs assigned to each of the members of a PSC and JV combination may change depending upon the net entitlement estimates for each PSC, JV and partner combination in subsequent periods.

Next, at step 208, the actual volumes of production for each PSC and JV may be apportioned across Lifting Partner Groups and the percentage of sales for each PSC and JV may be calculated. Then, with these percentage splits, the actual volume of each lift attributable to the individual members of the PSC and associated JV's may be calculated.

Before or after the volumes of each lift are calculated for each PSC member, the sales price may be adjusted for arm's length and non-arm's length transactions at step 209. Now, knowing the sales volumes and earnings assigned to each member of each PSC and associated JV as well as the weighted average sales price for the period, they may be used to calculate the actual COEPs for the subsequent period(s) using the terms of the PSC at step 210. Likewise, this information may also be used to make forward estimates of COEP allocations at step 203.

Figure 3:
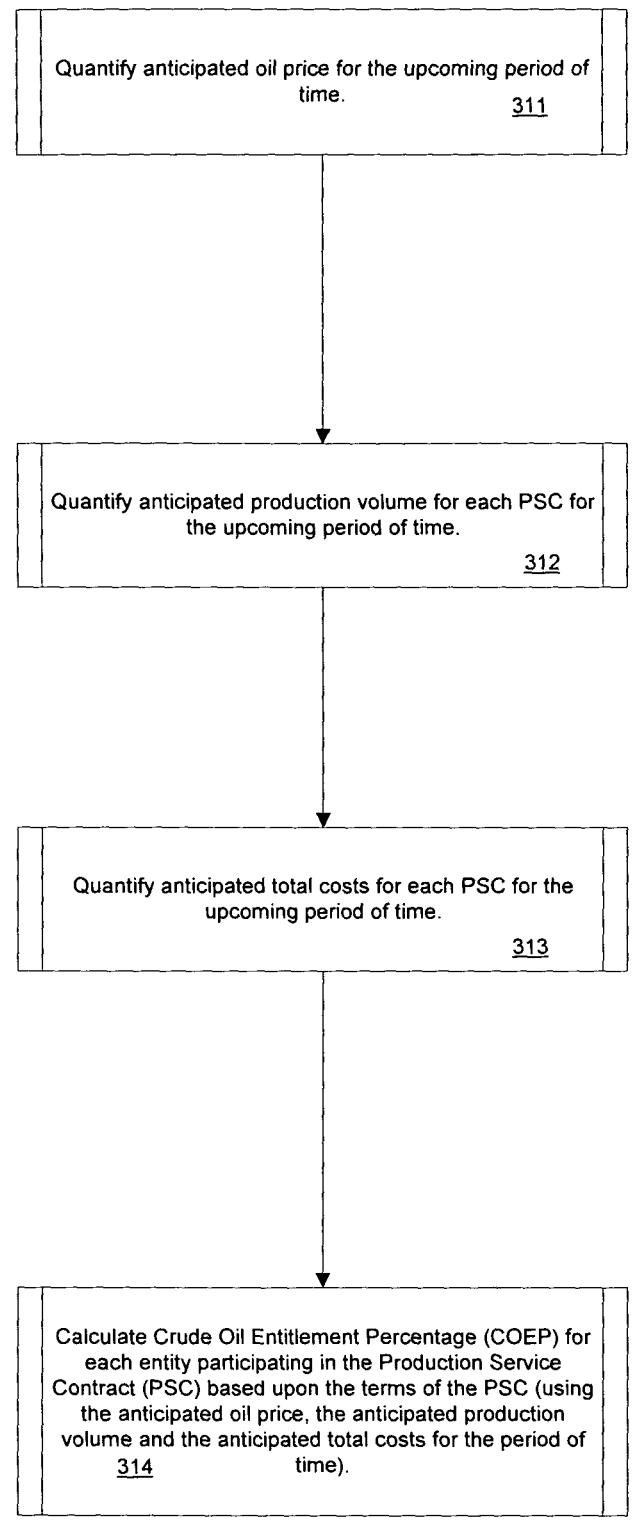
FIG. 3 is a flow chart of steps for determining estimated crude oil entitlement percentage in accordance with the present invention.

FIG. 3 is a flow chart of a process that may be used to calculate the Crude Oil Entitlement Percentage (COEP) discussed above.

In step 311, the oil price may be quantified, as an estimate of the anticipated price, or based on previous period prices. Next, at step 312, the production volume for each PSC may be quantified. Then, at step 313, the claimable costs from the period for each PSC may be quantified and finally, at step 314, the COEP may be calculated using the terms set out by the PSC contract. These terms could include splits between government and contractors, royalties, cost cap limits, and profit calculations as factors to be accounted for.

Figure 4:
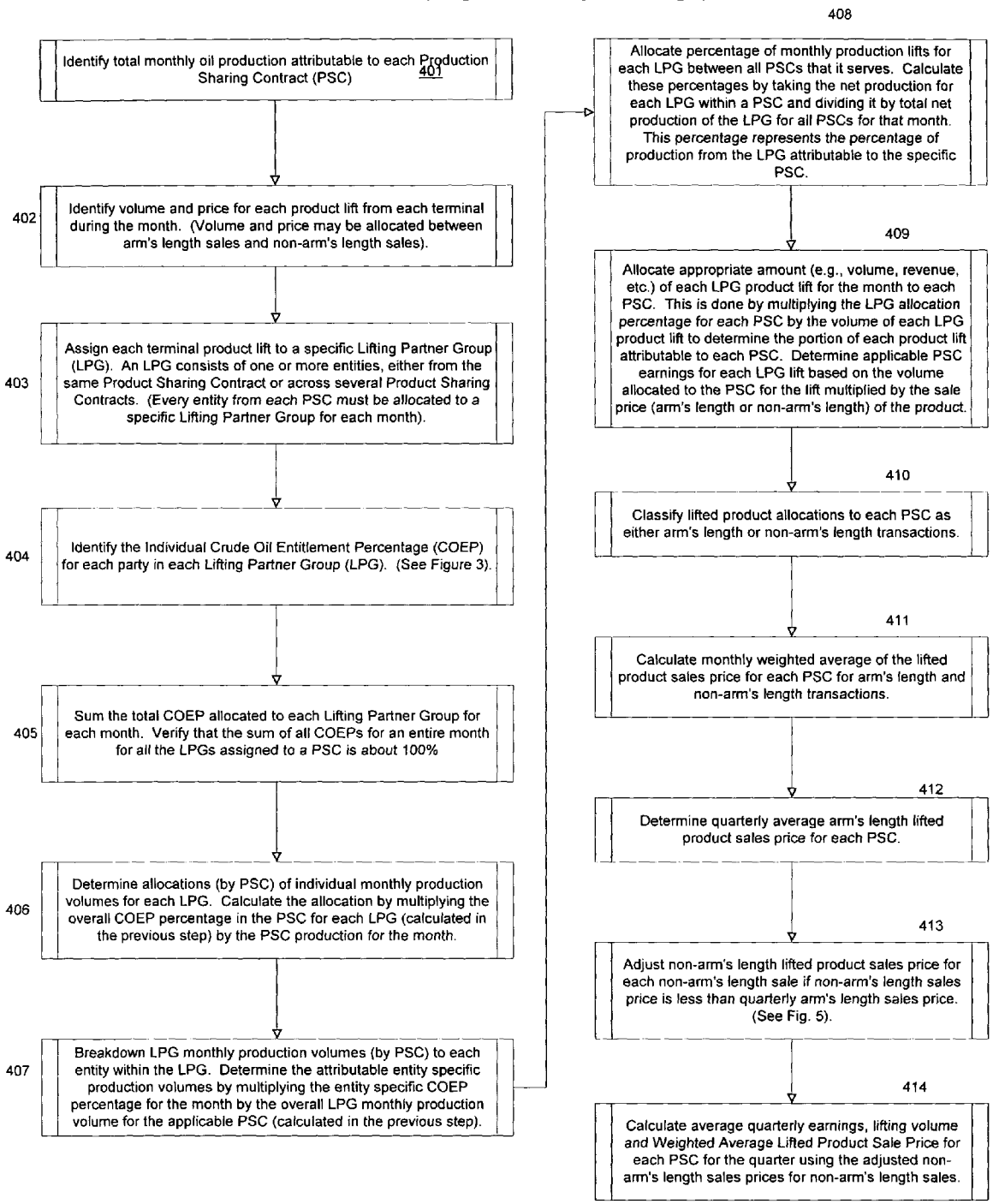
FIG. 4 is a flow chart of a production sharing accounting process that employs lifting partner groups in accordance with the present invention.

FIG. 4 provides a manner by which product lifts may be allocated to PSC and associated JV members in accord with the present invention. This manner may begin by identifying the total monthly oil production attributable to each Production Sharing Contract (PSC) as shown in step 401. Then, in step 402, the volume and price for each product lift from each terminal during the month may be identified. (Each lift may be allocated between arm's length sales and non-arm's length sales). Next, at step 403, each terminal product lift may be assigned to a specific Lifting Partner Group (LPG), with each LPG consisting of one or more entities, either from the same Production Sharing Contract or across several Production Sharing Contracts. (Every entity from each PSC must be allocated to a specific Lifting Partner Group for each month). Next, at step 404, the Crude Oil Entitlement Percentage (COEP) for each lifting partner group and each party in each Lifting Partner Group (LPG) may be determined as shown in FIG. 3.

Next, at step 405, the total COEP allocated to each Lifting Partner Group for each month may be summed and the total of all COEPs for an entire month for all the LPGs assigned to a PSC may be verified to be 100%. Next, the allocations (by PSC) of individual monthly production volumes for each LPG may be determined. This may include calculating the allocation by multiplying the overall COEP percentage in the PSC for each LPG (calculated in the previous step) by the PSC production for the month. After this is done, LPG monthly production volumes (by PSC) may be broken down to each entity within the LPG at step 407. The attributable entity specific production volumes may be also determined by multiplying the entity specific COEP percentage for the month by the overall LPG monthly production volume for the applicable PSC (calculated in the previous step).

Next, at step 408, the monthly production per PSC is split across all LPG's according to the COEP calculation (from step 404) per LPG and PSC. From these volumetric amounts, the percentage of production per LPG and PSC can be calculated by taking the net production for each LPG within a PSC and dividing it by total net production assigned to the LPG across all PSCs for that period. This percentage represents the percentage of production of the PSC's attributable to each LPG. These percentages will be used to split lifts across PSC's.

Then, at step 409, the volumes of each LPG product lift for the period may be allocated to each PSC. This is done by multiplying the LPG allocation percentage for each PSC (from step 408) by the volume of each LPG product lift to determine the portion of each product lift attributable to each PSC. The applicable PSC earnings for each LPG lift may be based on the volume allocated to the PSC for the lift multiplied by the sale price (arm's length or non-arm's length) of the product.

At step 411, the lifted product allocations to each PSC may be classified as either arm's length or non-arm's length transactions. Having this classification, the monthly weighted average of the lifted product sales price for each PSC for arm's length and non-arm's length transactions may be calculated, as shown in FIG. 411. The quarterly average arm's length lifted product sales price for each PSC may be determined at 412, and then the price for each non-arm's length lifted product sale, if non-arm's length sales price is less than quarterly arm's length sales price, may be adjusted at step 413. (See FIG. 5). Finally, the average quarterly earnings, lifting volumes and Weighted Average Lifted Product Sale Price for each PSC for the quarter may be calculated using the arm's length sales volumes and earnings, and the adjusted non-arm's length sales prices and volumes for non-arm's length sales.

Figure 5:
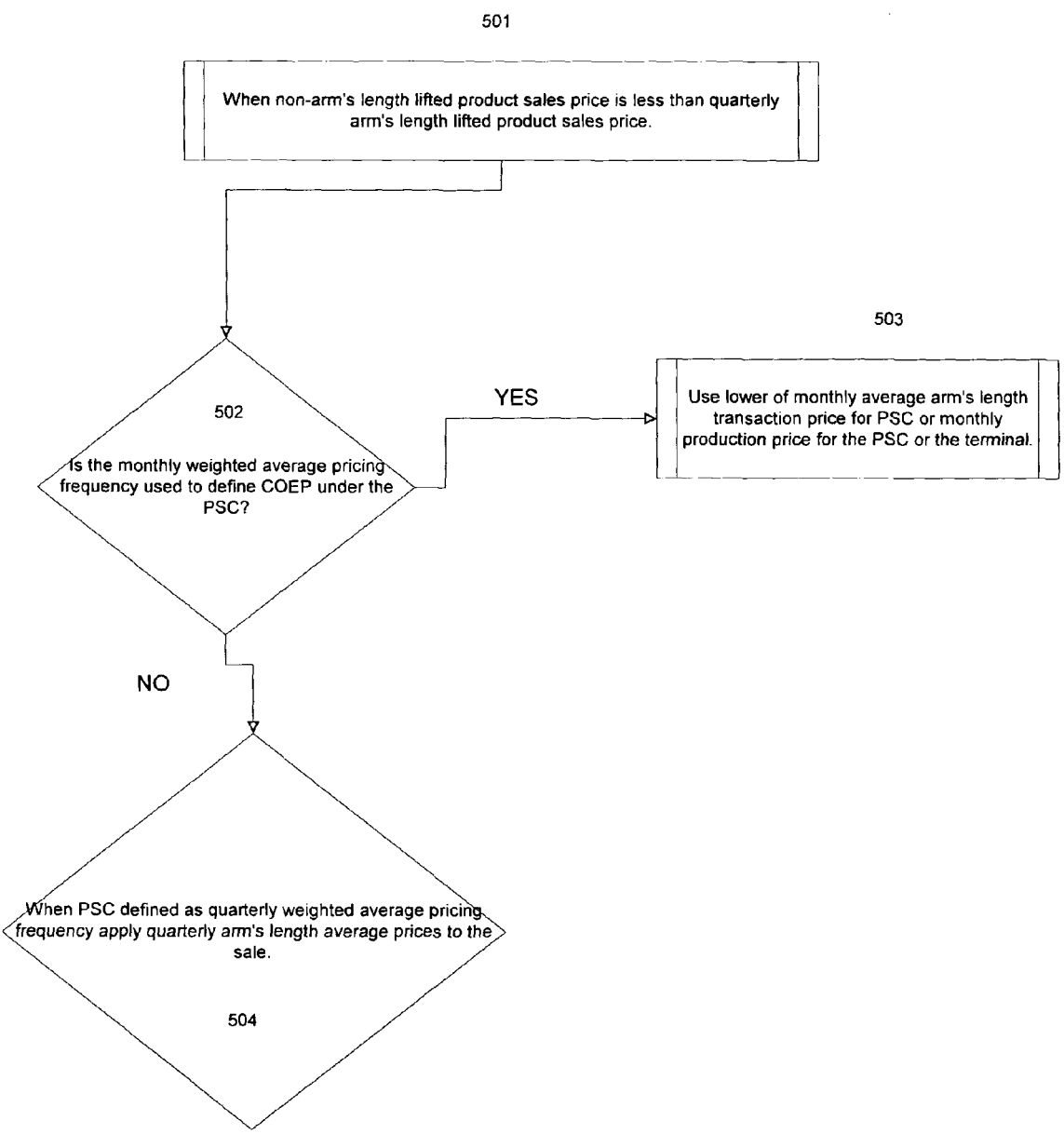
FIG. 5 is a flow chart of steps that may be employed to adjust sale prices to account for arm's length and non-arm's length transactions in accordance with the present invention.

FIG. 5 is a flow chart showing how the sales price of lifted product may be adjusted for non-arm's length transactions. In this method, when the non-arms length lifted product sales price is less than the quarterly arm's length lifted product sales price a query as shown in step 502 may be made. There, if the weighted average pricing frequency used to define the COEP is monthly for a particular PSC, then step 503 may be performed, otherwise step 504 may be performed. In step 503, the lower of the monthly average sales prices for the PSC and the production price for the PSC may be used as the sales price, but only in cases where the non-arm's length sales price is lower that the arm's length sales price. Comparatively, if the non-arm's length transactions are lower than the arm's length average price, then the quarterly arm's length average prices may be used when the weighted average price frequency for a PSC is quarterly, as shown in step 504.

Figure 6:
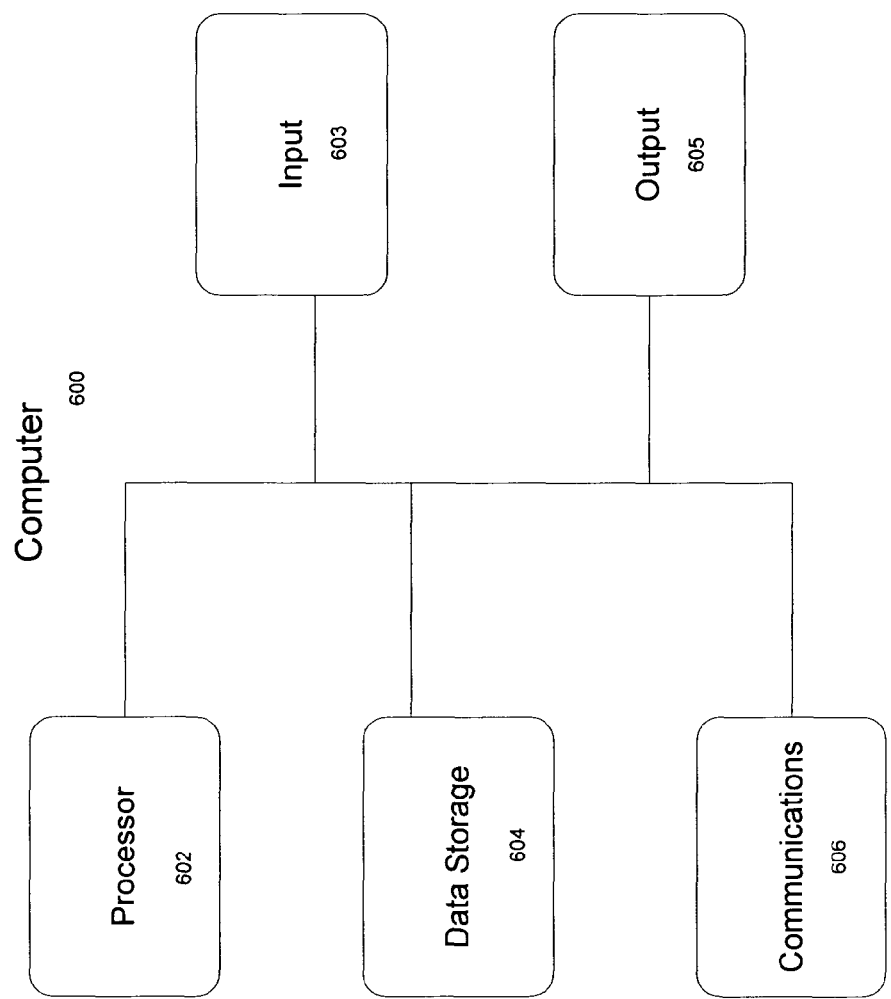
FIG. 6 is a computer that may be employed in the present invention.

FIG. 6 is a computer that may be used to perform the methods and processes of the present invention. Alternatively, this compute may be one of several that each perform the methods and processes of the present invention or that perform portions of the method or process. This computer 600 may include a bus 601 that connects processor 602, storage 604, communications device 606, and input and out device 603 and 605. In use, instructions for the processor and the other devices within the computer to carry out the above methods and processes may be stored in the data storage 604 or they may be received through communication device 606. Other methods of loading and storing the instructions may also be used.

In one embodiment, the storage 604 may contain data structures that are searchable and contain COEPs by PSC for each PSC member. Likewise this data storage may also contain data structures that contain product prices, such as oil prices, that are both estimated and actual, for use in the present invention. Additional information that may also be stored there include the identity of each member for each lifting partner group, the period of time that each member has been a member of the lifting partner group, and the COEPs allocated to each member of the lifting partner group. Having access to this stored data, the processor 602 may then access this data as well as data stored elsewhere to complete the steps described throughout this disclosure. For instance, the processor may retrieve the anticipated oil price for an upcoming period along with an anticipated production volume and production costs and may then calculate a COEP for entity in a PSC based upon the terms of the PSC, which are stored, and these anticipated production volumes, prices, and costs. Alternatively, the processor may complete portions of these or the other steps described above and may then forward the partially completed data to other processors for subsequent completion and output.

Figure 7:
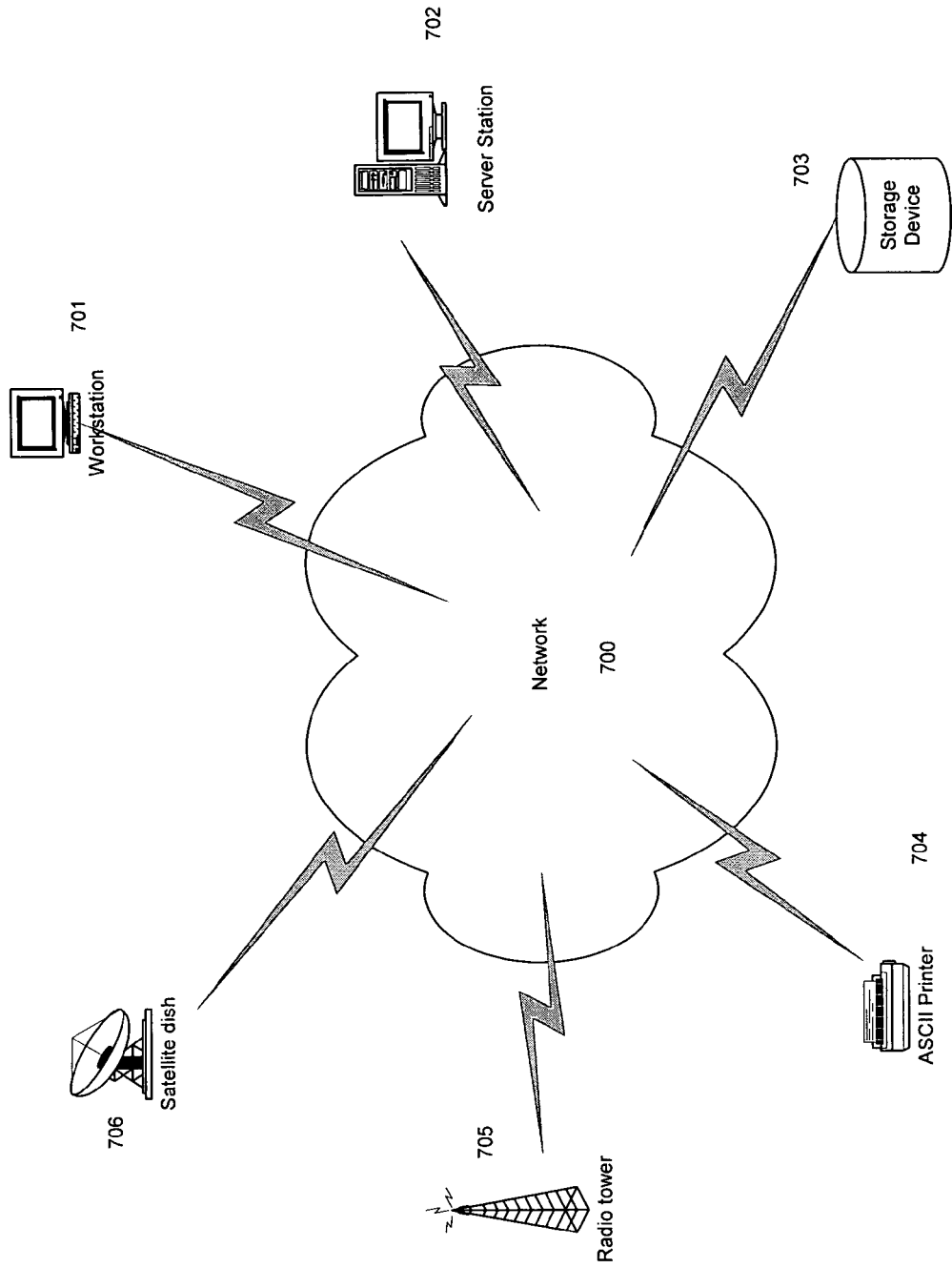
FIG. 7 is a network that may be employed in the present invention.

FIG. 7 is a network that may be employed to carry out the methods and processes of the present invention. This network 700 may include a workstation, a server 702, a storage device 703, a printer 704, a radio tower 705, and a satellite dish 706. These devices may communicate in and among themselves to exchange data and instructions in order to carry out the various steps of the present invention described herein.

A Quantitative Example Employing the Present Invention Follows.

| Assume the following per the PSC terms & conditions: | | | |
|---|---|---|---|
| Party | PSC Profit Share | Venture Equity | Profit Split Among All Parties |
| PSC1 | | | |
| Government | 40% | | 40% |
| Contracting Oil Co. | 60% | 50% | 30% |
| Venture Partner 1 | | 50% | 30% |
| | 100% | 100% | 100% |
| PSC2 | | | |
| Government | 40% | | 40% |
| Contracting Oil Co. | 60% | 60% | 36% |
| Venture Partner 1 | | 20% | 12% |
| Venture Partner 2 | | 20% | 12% |
| | 100% | 100% | 60% |

| Also assume the following planning has been determined by the contractor: | |
|---|---|
| Estimated Production | BOEPM |
| PSC1 - Well 1 | 50,000 |
| PSC1 - Well 2 | 20,000 |
| PSC1 - Well 3 | 30,000 |
| PSC2 - Well 1 | 25,000 |
| PSC2 - Well 2 | 25,000 |

| Estimated Costs for Recovery | | |
|---|---|---|
| PSC1 | 6,000,000 | Recoverable at 40% |
| PSC2 | 4,000,000 | Recoverable at 50% |

| Estimated Oil Price | |
|---|---|
| Month 1 | 35.00 |
| Month 2 | 36.00 |
| Month 3 | 37.00 |

| Planned Entitlements | | Government Share | Contractor Share | Venture Partner 1 | Venture Partner 2 |
|---|---|---|---|---|---|
| PSC1 | | | | | |
| Production Revenue | 10,800,000 | | | | |
| Royalties (assume 20%) | 2,160,000 | 2,160,000 | | | |
| Net Production for Sharing | 8,640,000 | | | | |
| Cost Cap Remaining (assume 90%) | 7,776,000 | | | | |
| Total Costs for Recovery | 2,400,000 | | 1,200,000 | 1,200,000 | |

-continued

| | | | | |
|---|---|---|---|---|
| Net Profit Excluding Excess | 864,000 | 345,600 | 259,200 | 259,200 |
| Excess Profit (assume all to gov't) | 5,376,000 | 5,376,000 | | |
| Net Entitlement | 10,800,000 | 7,881,600 | 1,459,200 | 1,459,200 |
| COEP/Planned Entitlement per Party: | 100.00% | 72.98% | 13.51% | 13.51% |

PSC2

| | | | | | |
|---|---|---|---|---|---|
| Production Revenue | 5,400,000 | | | | |
| Royalties (assume 20%) | 1,080,000 | 1,080,000 | | | |
| Net Production for Sharing | 4,320,000 | | | | |
| Cost Cap Remaining (assume 90%) | 3,888,000 | | | | |
| Total Costs for Recovery | 2,000,000 | | 1,200,000 | 400,000 | 400,000 |
| Net Profit Excluding Excess | 432,000 | 172,800 | 155,520 | 51,840 | 51,840 |
| Excess Profit (assume all to gov't) | 1,888,000 | 1,888,000 | | | |
| Net Entitlement | 5,400,000 | 3,140,800 | 1,355,520 | 451,840 | 451,840 |
| COEP/Planned Entitlement per Party: | 100.00% | 58.16% | 25.10% | 8.37% | 8.37% |

COEP's: (simplified - as it would normally be calculated per month)

| PSC | Product | Year | Period | Partner | COEP % |
|---|---|---|---|---|---|
| PSC1 | OIL | 2004 | 1 | Government | 72.98% |
| PSC1 | OIL | 2004 | 1 | Contractor | 13.51% |
| PSC1 | OIL | 2004 | 1 | JV Partner 1 | 13.51% |
| PSC1 | OIL | 2004 | 2 | Government | 72.98% |
| PSC1 | OIL | 2004 | 2 | Contractor | 13.51% |
| PSC1 | OIL | 2004 | 2 | JV Partner 1 | 13.51% |
| PSC1 | OIL | 2004 | 3 | Government | 72.98% |
| PSC1 | OIL | 2004 | 3 | Contractor | 13.51% |
| PSC1 | OIL | 2004 | 3 | JV Partner 1 | 13.51% |
| PSC2 | OIL | 2004 | 1 | Government | 58.16% |
| PSC2 | OIL | 2004 | 1 | Contractor | 25.10% |
| PSC2 | OIL | 2004 | 1 | JV Partner 1 | 8.37% |
| PSC2 | OIL | 2004 | 1 | JV Partner 2 | 8.37% |
| PSC2 | OIL | 2004 | 2 | Government | 58.16% |
| PSC2 | OIL | 2004 | 2 | Contractor | 25.10% |
| PSC2 | OIL | 2004 | 2 | JV Partner 1 | 8.37% |
| PSC2 | OIL | 2004 | 2 | JV Partner 2 | 8.37% |
| PSC2 | OIL | 2004 | 3 | Government | 58.16% |
| PSC2 | OIL | 2004 | 3 | Contractor | 25.10% |
| PSC2 | OIL | 2004 | 3 | JV Partner 1 | 8.37% |
| PSC2 | OIL | 2004 | 3 | JV Partner 2 | 8.37% |

| Production Source | Transport via | to Terminal |
|---|---|---|
| PSC1 - Well 1 | pipeline 1 | Terminal 1 |
| PSC1 - Well 2 | pipeline 2 | Terminal 1 |
| PSC1 - Well 3 | Truck | Terminal 1 |
| PSC2 - Well 1 | pipeline 2 or truck | Terminal 1 |
| PSC2 - Well 2 | pipeline 2 | Terminal 1 |

| Company | PSC | Product | Venture | Terminal |
|---|---|---|---|---|
| 0001 | PSC1 | OIL | JV0001 | Terminal 1 |
| 0001 | PSC2 | OIL | JV0002 | Terminal 1 |

| Company | Group | Year | Period | Partner |
|---|---|---|---|---|
| 0001 | LPG1 | 2004 | 1 | Government |
| 0001 | | 2004 | 1 | National Oil Company A |
| 0001 | | 2004 | 1 | National Oil Company B |
| 0001 | LPG2 | 2004 | 1 | Contractor |
| 0001 | | 2004 | 1 | Contractor's Subsidiary A |
| 0001 | | 2004 | 1 | Contractor's Subsidiary B |
| 0001 | | 2004 | 1 | Contractor's Subsidiary C |
| 0001 | | 2004 | 1 | JV Partner 2 |
| 0001 | LPG3 | 2004 | 1 | JV Partner 1 |
| 0001 | LPG2 | 2004 | 3 | Contractor |
| 0001 | | 2004 | 3 | Contractor's Subsidiary A |

-continued

| | | | |
|---|---|---|---|
| 0001 | 2004 | 3 | Contractor's Subsidiary B |
| 0001 | 2004 | 3 | Contractor's Subsidiary C |
| 0001 | 2004 | 3 | JV Partner 2 |
| 0001 | 2004 | 3 | JV Partner 1 |

| Transaction # | Month | Terminal | LPG | Product | Quantity | Price | AL/NAL |
|---|---|---|---|---|---|---|---|
| 1 | 1 | Terminal 1 | LPG1 | OIL | 60,000 | 31.00 | NAL |
| 2 | 1 | Terminal 1 | LPG2 | OIL | 50,000 | 35.50 | AL |
| 3 | 1 | Terminal 1 | LPG3 | OIL | 30,000 | 36.00 | AL |
| 4 | 2 | Terminal 1 | LPG1 | OIL | 80,000 | 32.00 | NAL |
| 5 | 2 | Terminal 1 | LPG2 | OIL | 60,000 | 32.00 | NAL |
| 6 | 2 | Terminal 1 | LPG3 | OIL | 30,000 | 37.00 | AL |
| 7 | 3 | Terminal 1 | LPG1 | OIL | 80,000 | 30.00 | NAL |
| 8 | 3 | Terminal 1 | LPG2 | OIL | 40,000 | 37.50 | AL |
| 9 | 3 | Terminal 1 | LPG2 | OIL | 20,000 | 37.00 | AL |
| | | | | | 450,000 | | |

Actual Production and Sales

| | Month 1 | Month 2 | Month 3 |
|---|---|---|---|
| Actual Production | | | |
| PSC1 - Well 1 | 50,000 | 50,000 | 45,000 |
| PSC1 - Well 2 | 40,000 | 40,000 | 10,000 |
| PSC1 - Well 3 | 30,000 | 35,000 | 35,000 |
| PSC2 - Well 1 | 30,000 | 32,000 | 31,000 |
| PSC2 - Well 2 | 26,000 | 27,000 | 27,000 |
| Actual Costs for Recovery | | | |
| PSC1 | 4,500,000.00 | 1,000,000.00 | 2,000,000.00 |
| PSC2 | 3,500,000.00 | 700,000.00 | 800,000.00 |
| Actual Market Oil Price | | | |
| Month 1 | 36.00 | 36.50 | 38.00 |

Terminal Interface to Production Step 1
Total production Percentages Across PSC's

| | PSC1 | PSC2 | Total |
|---|---|---|---|
| Month 1 | 120,000 | 56,000 | 176,000 BBL |
| | 68.18% | 31.82% | |
| Month 2 | 125,000 | 59,000 | 184,000 BBL |
| | 67.93% | 32.07% | |
| Month 3 | 90,000 | 58,000 | 148,000 BBL |
| | 60.81% | 39.19% | |

Terminal Interface to Production Step 2
Determine COEP's per Partner and LPG and PSC
LPG Parties:

| | LPG | Government | Contractor | JV Partner 1 | JV Partner 2 |
|---|---|---|---|---|---|
| Month 1 | LPG1 | YES | NO | NO | NO |
| | LPG2 | NO | YES | NO | YES |
| | LPG3 | NO | NO | YES | NO |
| Month 2 | LPG1 | YES | NO | NO | NO |
| | LPG2 | NO | YES | NO | YES |
| | LPG3 | NO | NO | YES | NO |
| Month 3 | LPG1 | YES | NO | NO | NO |
| | LPG2 | NO | YES | YES | YES |
| | LPG3 | NO | NO | NO | NO |

COEP's per month and Party and PSC

| | Gov't | Contractor | JV Partner 1 | JV Partner 2 |
|---|---|---|---|---|
| PSC1 | | | | |
| Month 1 | 72.98% | 13.51% | 13.51% | |
| Month 2 | 72.98% | 13.51% | 13.51% | |
| Month 3 | 72.98% | 13.51% | 13.51% | |

-continued

|  | | | | | |
|---|---|---|---|---|---|
| PSC2 | | | | | |
| Month 1 | 58.16% | 25.10% | 8.37% | 8.37% |
| Month 2 | 58.16% | 25.10% | 8.37% | 8.37% |
| Month 3 | 58.16% | 25.10% | 8.37% | 8.37% |

COEP's per month/Party/LPG/PSC

| | | PSC 1 | | | PSC2 | | | |
|---|---|---|---|---|---|---|---|---|
| | | Government | Contractor | JV Partner 1 | Government | Contr'tor | JV P 1 | JV P 2 |
| Month 1 | LPG1 | 72.98% | — | — | 58.16% | — | — | — |
| | LPG2 | — | 13.51% | — | — | 25.10% | — | 8.37% |
| | LPG3 | — | — | 13.51% | — | — | 8.37% | — |
| Month 2 | LPG1 | 72.98% | — | — | 58.16% | — | — | — |
| | LPG2 | — | 13.51% | — | — | 25.10% | — | 8.37% |
| | LPG3 | — | — | 13.51% | — | — | 8.37% | — |
| Month 3 | LPG1 | 72.98% | — | — | 58.16% | — | — | — |
| | LPG2 | — | 13.51% | 13.51% | — | 25.10% | 8.37% | 8.37% |
| | LPG3 | — | — | — | — | — | — | — |

COEP's summarized per LPG and PSC:

| | | | PSC1 | PSC2 |
|---|---|---|---|---|
| Month 1 | | LPG1 | 72.98% | 58.16% |
| | | LPG2 | 13.51% | 33.47% |
| | | LPG3 | 13.51% | 8.37% |
| Month 2 | | LPG1 | 72.98% | 58.16% |
| | | LPG2 | 13.51% | 33.47% |
| | | LPG3 | 13.51% | 8.37% |
| Month 3 | | LPG1 | 72.98% | 58.16% |
| | | LPG2 | 27.02% | 41.84% |
| | | LPG3 | 0.00% | 0.00% |

Terminal Interface to Production Step 3

| | Total PSC1 | PSC1 | | | Total PSC2 | PSC2 | | | Total | | |
|---|---|---|---|---|---|---|---|---|---|---|---|
| | PSC1 | LPG1 | LPG2 | LPG3 | PSC2 | LPG1 | LPG2 | LPG3 | LPG1 | LPG2 | LPG3 |

Split Actual Production per PSC across LPG's

| | | | | | | | | | | | |
|---|---|---|---|---|---|---|---|---|---|---|---|
| Mo. 1 | 120,000 | 87,573 | 16,213 | 16,213 | 56,000 | 32,571 | 18,743 | 4,686 | 120,145 | 34,956 | 20,899 |
| Mo. 2 | 125,000 | 91,222 | 16,889 | 16,889 | 59,000 | 34,316 | 19,747 | 4,937 | 125,538 | 36,636 | 21,826 |
| Mo. 3 | 90,000 | 65,680 | 24,320 | 0 | 58,000 | 33,735 | 24,265 | 0 | 99,415 | 48,585 | 0 |
| | 335,000 | | | | 173,000 | | | | | | 508,000 |
| | | | | | 508,000 | | | | | | |

Compute Sales Split Percentage:

| | | | | | | | | | | | |
|---|---|---|---|---|---|---|---|---|---|---|---|
| Mo. 1 | 68.18% | 72.89% | 46.38% | 77.58% | 31.82% | 27.11% | 53.62% | 22.42% | 100.00% | 100.00% | 100.00% |
| Mo. 2 | 67.93% | 72.66% | 46.10% | 77.38% | 32.07% | 27.34% | 53.90% | 22.62% | 100.00% | 100.00% | 100.00% |
| Mo. 3 | 60.81% | 66.07% | 50.06% | 0.00% | 39.19% | 33.93% | 49.94% | 0.00% | 100.00% | 100.00% | 0.00% |

Split Actual Production per PSC across all partners to determine splits for Storage Entitlements:

| | Total PSC1 | PSC1 | | | Total PSC2 | PSC2 | | | Total | | | |
|---|---|---|---|---|---|---|---|---|---|---|---|---|
| | PSC1 | Gov't | Contr. | JV Ptr 1 | PSC2 | Gov't | Contr. | JV Ptr 1 | JV Ptr 2 | Gov't | Contr. | JV Ptr 1 | JV Ptr 2 |
| Mo. 1 | 120,000 | 87,573 | 16,213 | 16,213 | 56,000 | 32,571 | 14,057 | 4,686 | 4,686 | 120,145 | 30,271 | 20,899 | 4,686 |
| Mo. 2 | 125,000 | 91,222 | 16,889 | 16,889 | 59,000 | 34,316 | 14,810 | 4,937 | 4,937 | 125,538 | 31,699 | 21,826 | 4,937 |
| Mo. 3 | 90,000 | 65,680 | 12,160 | 12,160 | 58,000 | 33,735 | 14,559 | 4,853 | 4,853 | 99,415 | 26,719 | 17,013 | 4,853 |
| | 335,000 | | | | 173,000 | | | | | | | | 508,000 |
| | | | | | 508,000 | | | | | | | | |

Terminal Interface to Production Step 4
Apportion Lifted Volumes back to the PSC's according to the sales split

| Trans | Mo. | Term. | PSC | LPG | Prod | Sales Split % | Qty | PSC Share | Price | AL/NAL | PSC Earnings | Mo. Earnings | Monthly Lift Q | AL Av. Price |
|---|---|---|---|---|---|---|---|---|---|---|---|---|---|---|
| 2 | 1 | ter. 1 | PSC1 | LPG2 | OIL | 46.38% | 50,000 | 23,191 | 35.5 | AL | 823,274.93 | | | |
| 3 | 1 | ter. 1 | PSC1 | LPG3 | OIL | 77.58% | 30,000 | 23,274 | 36.0 | AL | 837,855.00 | 1,661,129.93 | 46,465 | 35.75 |

-continued

| Trans | Mo. | Terminal | PSC | LPG | Prod | Sales Split % | Qty | PSC Share | Price | AL/NAL | PSC Earnings | Mo. Earnings | Mo. Lift Q | AL Av. Price | |
|---|---|---|---|---|---|---|---|---|---|---|---|---|---|---|---|
| 6 | 2 | ter. 1 | PSC1 | LPG3 | OIL | 77.38% | 30,000 | 23,214 | 37.0 | AL | 858,927.85 | 858,927.85 | 23,214 | 37.00 | |
| 8 | 3 | ter. 1 | PSC1 | LPG2 | OIL | 50.06% | 40,000 | 20,022 | 37.5 | AL | 750,841.59 | | | | |
| 9 | 3 | ter. 1 | PSC1 | LPG2 | OIL | 50.06% | 20,000 | 10,011 | 37.0 | AL | 370,415.18 | 1,121,256.77 | 30,034 | 37.33 | |
| | | | | | | | | 99,713 | | | 3,641,314.55 | | | 36.52 | |
| 2 | 1 | ter. 1 | PSC2 | LPG2 | OIL | 53.62% | 50,000 | 26,809 | 35.5 | AL | 951,725.07 | | | | |
| 3 | 1 | ter. 1 | PSC2 | LPG3 | OIL | 22.42% | 30,000 | 6,726 | 36.0 | AL | 242,145.00 | 1,193,870.07 | 33,535 | 35.60 | |
| 6 | 2 | ter. 1 | PSC2 | LPG3 | OIL | 22.62% | 30,000 | 6,786 | 37.0 | AL | 251,072.15 | 251,072.15 | 6,786 | 37.00 | |
| 8 | 3 | ter. 1 | PSC2 | LPG2 | OIL | 49.94% | 40,000 | 19,978 | 37.5 | AL | 749,158.41 | | | | |
| 9 | 3 | ter. 1 | PSC2 | LPG2 | OIL | 49.94% | 20,000 | 9,989 | 37.0 | AL | 369,584.82 | 1,118,743.23 | 29,966 | 37.33 | |
| Total AL Lifting | | | | | | | | 70,287 | | | 2,563,685.45 | | | 36.47 | 170,000 |
| 1 | 1 | ter. 1 | PSC1 | LPG1 | OIL | 72.89% | 60,000 | 43,734 | 31.0 | NAL | | | | | |
| 4 | 2 | ter. 1 | PSC1 | LPG1 | OIL | 72.66% | 80,000 | 58,132 | 32.0 | NAL | | | | | |
| 5 | 2 | ter. 1 | PSC1 | LPG2 | OIL | 46.10% | 60,000 | 27,660 | 32.0 | NAL | | | | | |
| 7 | 3 | ter.I 1 | PSC1 | LPG1 | OIL | 66.07% | 80,000 | 52,853 | 30.0 | NAL | | | | | |
| | | | | | | | | 182,379 | | | | | | | |
| 1 | 1 | ter. 1 | PSC2 | LPG1 | OIL | 27.11% | 60,000 | 16,266 | 31.0 | NAL | | | | | |
| 4 | 2 | ter.I 1 | PSC2 | LPG1 | OIL | 27.34% | 80,000 | 21,868 | 32.0 | NAL | | | | | |
| 5 | 2 | ter.I 1 | PSC2 | LPG2 | OIL | 53.90% | 60,000 | 32,340 | 32.0 | NAL | | | | | |
| 7 | 3 | ter.I 1 | PSC2 | LPG1 | OIL | 33.93% | 80,000 | 27,147 | 30.0 | NAL | | | | | |
| Total NAL Lifting | | | | | | | | 97,621 | | | | | | | 280,000 |
| Total | | | | | | | | | | | | | | | 450,000 |

Terminal Interface to Production Step 5
Adjust Non-arm's length sales according to rules:

| Trans | Mo. | Terminal | PSC | LPG | Prod | Sales Split % | Qty | PSC Share | Price | AL/NAL | PSC Earnings | Mo. Earnings | Mo. Lift Q | AL Av. Price | |
|---|---|---|---|---|---|---|---|---|---|---|---|---|---|---|---|
| 2 | 1 | Ter. 1 | PSC1 | LPG2 | OIL | 46.38% | 50,000 | 23,191 | 35.50 | AL | 823,274.93 | | | | |
| 3 | 1 | Ter. 1 | PSC1 | LPG3 | OIL | 77.58% | 30,000 | 23,274 | 36.00 | AL | 837,855.00 | 1,661,129.9 | 46,465 | 35.75 | |
| 6 | 2 | Ter. 1 | PSC1 | LPG3 | OIL | 77.38% | 30,000 | 23,214 | 37.00 | AL | 858,927.85 | 858,927.85 | 23,214 | 37.00 | |
| 8 | 3 | Ter.I 1 | PSC1 | LPG2 | OIL | 50.06% | 40,000 | 20,022 | 37.50 | AL | 750,841.59 | | | | |
| 9 | 3 | Ter. 1 | PSC1 | LPG2 | OIL | 50.06% | 20,000 | 10,011 | 37.00 | AL | 370,415.18 | 1,121,256.7 | 30,034 | 37.33 | |
| | | | | | | | | 99,713 | | | 3,641,314.5 | | | 36.52 | |
| 2 | 1 | Ter. 1 | PSC2 | LPG2 | OIL | 53.62% | 50,000 | 26,809 | 35.50 | AL | 951,725.07 | | | | |
| 3 | 1 | Ter.I 1 | PSC2 | LPG3 | OIL | 22.42% | 30,000 | 6,726 | 36.00 | AL | 242,145.00 | 1,193,870.0 | 33,535 | 35.60 | |
| 6 | 2 | Ter. 1 | PSC2 | LPG3 | OIL | 22.62% | 30,000 | 6,786 | 37.00 | AL | 251,072.15 | 251,072.15 | 6,786 | 37.00 | |
| 8 | 3 | Ter. 1 | PSC2 | LPG2 | OIL | 49.94% | 40,000 | 19,978 | 37.50 | AL | 749,158.41 | | | | |
| 9 | 3 | Ter.I 1 | PSC2 | LPG2 | OIL | 49.94% | 20,000 | 9,989 | 37.00 | AL | 369,584.82 | 1,118,743.2 | 29,966 | 37.33 | |
| Total AL Lifting | | | | | | | | 70,287 | | | 2,563,685.4 | | | 36.47 | 170,000 |
| 1 | 1 | Ter. 1 | PSC1 | LPG1 | OIL | 72.89% | 60,000 | 43,734 | 36.52 | NAL | 1,597,082.6 | | | | |
| 4 | 2 | Ter. 1 | PSC1 | LPG1 | OIL | 72.66% | 80,000 | 58,132 | 36.52 | NAL | 2,122,866.2 | | | | |
| 5 | 2 | Ter. 1 | PSC1 | LPG2 | OIL | 46.10% | 60,000 | 27,660 | 36.52 | NAL | 1,010,073.8 | | | | |
| 7 | 3 | Ter. 1 | PSC1 | LPG1 | OIL | 66.07% | 80,000 | 52,853 | 36.52 | NAL | 1,930,108.8 | | | | |
| | | | | | | | | 182,379 | | | 6,660,131.6 | | | | |
| 1 | 1 | Ter. 1 | PSC2 | LPG1 | OIL | 27.11% | 60,000 | 16,266 | 36.47 | NAL | 593,291.81 | | | | |
| 4 | 2 | Ter. 1 | PSC2 | LPG1 | OIL | 27.34% | 80,000 | 21,868 | 36.47 | NAL | 797,625.11 | | | | |
| 5 | 2 | Ter. 1 | PSC2 | LPG2 | OIL | 53.90% | 60,000 | 32,340 | 36.47 | NAL | 1,179,595.8 | | | | |
| 7 | 3 | Ter. 1 | PSC2 | LPG1 | OIL | 33.93% | 80,000 | 27,147 | 36.47 | NAL | 990,151.10 | | | | |
| Total NAL Lifting | | | | | | | | 97,621 | | | 3,560,663.9 | | | | 280,000 |
| Total | | | | | | | | | | | | | | | 450,000 |

| | Qtly Earnings | Qyly Lifting | WAL Price |
|---|---|---|---|
| PSC1 | 10,301,446.22 | 282,091 | 36.52 |
| PSC2 | 6,124,349.36 | 167,909 | 36.47 |

-continued

| | From the PSC terms & conditions: | | |
|---|---|---|---|
| PSC Party | PSC Profit Share | Venture Equity | Profit Split Among All PSC Parties |
| PSC1 | | | |
| Government | 40% | | 40% |
| Contracting Oil Co. | 60% | 50% | 30% |
| Venture Partner 1 | | 50% | 30% |
| | 100% | 100% | 100% |
| PSC2 | | | |
| Government | 40% | | 40% |
| Contracting Oil Co. | 60% | 60% | 36% |
| Venture Partner 1 | | 20% | 12% |
| Venture Partner 2 | | 20% | 12% |
| | 100% | 100% | 60% |

| Actual Entitlements PSC1 | | Government Share | Contractor Share | Venture Partner 1 |
|---|---|---|---|---|
| Production Revenue | 12,233,572 | | | |
| Royalties (assume 20%) | 2,446,714 | 2,446,714 | | |
| Net Production for Sharing | 9,786,858 | | | |
| Cost Cap Remaining (assume 90%) | 8,808,172 | | | |
| Total Costs for Recovery | 3,000,000 | | 1,500,000 | 1,500,000 |
| Net Profit Excluding Excess | 978,686 | 391,474 | 293,606 | 293,606 |
| Excess Profit (assume all to gov't) | 5,808,172 | 5,808,172 | | |
| Net Entitlement | 12,233,572 | 8,646,361 | 1,793,606 | 1,793,606 |
| COEP/Planned Entitlement per Party: | 100.00% | 70.68% | 14.66% | 14.66% |

| Actual Entitlements PSC 2 | | Government Share | Contractor Share | Venture Partner 1 | Venture Partner 2 | Excess Cost Carryfwd. |
|---|---|---|---|---|---|---|
| Production Revenue | 6,310,051 | | | | | |
| Royalties (assume 20%) | 1,262,010 | 1,262,010 | | | | |
| Net Production for Sharing | 5,048,041 | | | | | |
| Cost Cap Remaining (assume 90%) | 4,543,237 | | | | | |
| Total Costs for Recovery | 2,500,000 | | 1,500,000 | 500,000 | 500,000 | |
| Net Profit Excluding Excess | 504,804 | 201,922 | 181,729 | 60,576 | 60,576 | |
| Excess Profit (assume all to gov't) | 2,043,237 | 2,043,237 | | | | |
| Net Entitlement | 4,266,814 | 3,507,169 | 1,681,729 | 560,576 | 560,576 | |
| COEP/Planned Entitlement per Party: | 147.89% | 82.20% | 39.41% | 13.14% | 13.14% | |

Now you can compare the COEP's calculated before from the plan data to the actuals calculated above:

| PSC | Product | Year | Period | Partner | COEP % |
|---|---|---|---|---|---|
| PSC1 | OIL | 2004 | 1 | Government | 72.98% |
| PSC1 | OIL | 2004 | 1 | Contractor | 13.51% |
| PSC1 | OIL | 2004 | 1 | JV Partner 1 | 13.51% |
| PSC1 | OIL | 2004 | 2 | Government | 72.98% |
| PSC1 | OIL | 2004 | 2 | Contractor | 13.51% |
| PSC1 | OIL | 2004 | 2 | JV Partner 1 | 13.51% |
| PSC1 | OIL | 2004 | 3 | Government | 72.98% |
| PSC1 | OIL | 2004 | 3 | Contractor | 13.51% |
| PSC1 | OIL | 2004 | 3 | JV Partner 1 | 13.51% |
| PSC2 | OIL | 2004 | 1 | Government | 58.16% |
| PSC2 | OIL | 2004 | 1 | Contractor | 25.10% |
| PSC2 | OIL | 2004 | 1 | JV Partner 1 | 8.37% |
| PSC2 | OIL | 2004 | 1 | JV Partner 2 | 8.37% |
| PSC2 | OIL | 2004 | 2 | Government | 58.16% |
| PSC2 | OIL | 2004 | 2 | Contractor | 25.10% |
| PSC2 | OIL | 2004 | 2 | JV Partner 1 | 8.37% |
| PSC2 | OIL | 2004 | 2 | JV Partner 2 | 8.37% |
| PSC2 | OIL | 2004 | 3 | Government | 58.16% |
| PSC2 | OIL | 2004 | 3 | Contractor | 25.10% |
| PSC2 | OIL | 2004 | 3 | JV Partner 1 | 8.37% |
| PSC2 | OIL | 2004 | 3 | JV Partner 2 | 8.37% |

While several embodiments of the present invention have been described others are also plausible within the spirit and scope of the present invention. Accordingly, where certain steps have been set forth herein, these steps may be performed in order, concurrently, and in different orders while remaining within the spirit and scope of the present invention.

What is claimed is:

1. A programmable computer containing instructions that when executed comprise:
    identifying a product lift from a first shared storage facility storing products produced by a plurality of entities, the products being commingled in the first shared storage facility;
    creating a first lifting product group of two or more entities associated with a product comprising the product lift, the two or more entities being selected from among the plurality of entities;
    determining an entitlement percentage for each entity in the first lifting product group, comprising:
        calculating an estimated entitlement percentage for the each entity in the first lifting group using an estimated price of the product and an estimated production of the product over a predetermined time period;
        monitoring an actual production of the product by the two or more entities of the first lifting group over the predetermined time period;
        adjusting an actual price of the product to account for arm's length and non-arm's length transactions; and
        calculating an actual entitlement percentage for the each entity in the first lifting product group for the predetermined time period using the estimated entitlement percentage, the actual production of the product, and the adjusted actual price of the product; and
    allocating the product lift and a corresponding production revenue for the predetermined time period between the two or more entities of the first lifting product group using the actual entitlement percentage.

2. The programmable computer of claim 1 wherein the product lift is a volume of petroleum product.

3. The programmable computer of claim 2 wherein the instructions when executed further comprise:
    recording the sale type and price of the volume of petroleum product lifted from the storage facility.

4. The programmable computer of claim 3 wherein the storage facility is an above ground petroleum storage tank.

5. The programmable computer of claim 1 wherein the instructions when executed further comprise:
    creating a second lifting partner group with the identities of the two or more entities associated with the product comprising a second product lift,
    the members of the first lifting partner group being different from the members of the second lifting partner group.

6. The programmable computer of claim 5 wherein the instructions when executed further comprise:
    creating new first and second lifting product groups after a predetermined period of time has elapsed.

7. The programmable computer of claim 1 wherein the instructions when executed further comprise:
    calculating the monthly total of lifted product sales for each lifting group; and
    organizing these monthly totals by arm's length transactions and non-arm's length transactions.

8. The programmable computer of claim 1 wherein the instructions when executed further comprise:
    identifying the total monthly petroleum production attributable to each entity in the first lifting group.

9. The programmable computer of claim 1 wherein the instructions when executed further comprise:
    identifying a product lift from a second shared storage facility.

10. A computer readable storage media containing instructions for a computer that when executed comprise:
    identifying a product lift from a first shared storage facility storing products produced by a plurality of entities, the products being commingled in the first shared storage facility;
    creating a first lifting product group of two or more entities associated with a product comprising the product lift, the two or more entities being selected from among the plurality of entities;
    determining an entitlement percentage for each entity in the first lifting product group, comprising:
        calculating an estimated entitlement percentage for the each entity in the first lifting group using an estimated price of the product and an estimated production of the product over a predetermined time period;
        monitoring an actual production of the product by the two or more entities of the first lifting group over the predetermined time period;
        adjusting an actual price of the product to account for arm's length and non-arm's length transactions; and
        calculating an actual entitlement percentage for the each entity in the first lifting product group for the predetermined time period using the estimated entitlement percentage, the actual production of the product, and the adjusted actual price of the product; and
    allocating the product lift and a corresponding production revenue for the predetermined time period between the two or more entities of the first lifting product group using the actual entitlement percentage.

11. The computer readable storage media of claim 10 wherein the product lift is a volume of petroleum product.

12. The computer readable storage media of claim 11 wherein the instructions when executed further comprise:
    recording the sale type and price of the volume of petroleum product lifted from the storage facility.

13. The computer readable storage media of claim 12 wherein the storage facility is an above ground petroleum storage tank.

14. The computer readable storage media of claim 10 wherein the instructions when executed further comprise:
    creating a second lifting product group with the identities of the two or more entities associated with supplying the product comprising a second product lift,
    the members of the first lifting partner group being different from the members of the second lifting partner group.

15. The computer readable storage media of claim 14 wherein the instructions when executed further comprise:
    creating new first and second lifting product groups after a predetermined period of time has elapsed.

16. The computer readable storage media of claim 10 wherein the instructions when executed further comprise:
    calculating the monthly total of lifted product sales for each lifting group; and
    organizing these monthly totals by arm's length transactions and non-arm's length transactions.

17. The computer readable storage media of claim 10 wherein the instructions when executed further comprise:
    identifying the total monthly petroleum production attributable to each entity in the first lifting group.

18. The computer readable storage media of claim 10 wherein the instructions when executed further comprise:

identifying a product lift from a second shared storage facility.

19. A network of computers executing instructions that when executed cause one or more of the computers to complete steps individually or cumulatively comprising:
   identifying a product lift from a first shared storage facility storing products produced by a plurality of entities, the products being commingled in the first shared storage facility;
   creating a first lifting product group of two or more entities associated with supplying a product comprising the product lift, the two or more entities being selected from among the plurality of entities;
   determining an entitlement percentage for each entity in the first lifting product group, comprising:
      calculating an estimated entitlement percentage for the each entity in the first lifting group using an estimated price of the product and an estimated production of the product over a predetermined time period;
      monitoring an actual production of the product by the two or more entities of the first lifting group over the predetermined time period;
      adjusting an actual price of the product to account for arm's length and non-arm's length transactions; and
      calculating an actual entitlement percentage for the each entity in the first lifting product group for the predetermined time period using the estimated entitlement percentage, the actual production of the product, and the adjusted actual price of the product; and
   allocating the product lift and a corresponding production revenue for the predetermined time period between the two or more entities of the first lifting product group using the actual entitlement percentage.

20. The network of claim 19 wherein the product lift is a volume of petroleum product.

21. The network of claim 20 wherein the instructions when executed cause one or more of the computers to complete steps individually or cumulatively further comprising:
   recording the sale type and price of the volume of petroleum product lifted from the storage facility.

22. The network of claim 21 wherein the storage facility is an above ground petroleum storage tank.

23. The network of claim 19 wherein the instructions when executed cause one or more of the computers to complete steps individually or cumulatively further comprising:
   creating a second lifting product group with the identities of the two or more entities associated with supplying the product comprising a second product lift,
   the members of the first lifting partner group being different from the members of the second lifting partner group.

24. The network of claim 23 wherein the instructions when executed cause one or more of the computers to complete steps individually or cumulatively further comprising:
   creating new first and second lifting product groups after a predetermined period of time has elapsed.

25. The network of claim 19 wherein the instructions when executed cause one or more of the computers to complete steps individually or cumulatively further comprising:
   calculating the monthly total of lifted product sales for each lifting group; and
   organizing these monthly total by arm's length transactions and non-arm's length transactions.

26. The network of claim 19 wherein the instructions when executed cause one or more of the computers to complete steps individually or cumulatively further comprising:
   identifying the total monthly petroleum production attributable to each entity in the first lifting group.

27. The network of claim 19 wherein the instructions when executed cause one or more of the computers to complete steps individually or cumulatively further comprising:
   identifying a product lift from a second shared storage facility.

* * * * *